(12) United States Patent
Robinson

(10) Patent No.: US 7,216,553 B2
(45) Date of Patent: May 15, 2007

(54) APPARATUS AND METHOD FOR SETTING THE DRAG OF A FISHING REEL

(76) Inventor: Willaiam Robinson, 315 W. Lugonia Ave., Redlands, CA (US) 92374

( * ) Notice: Subject to any disclaimer, the term of this patent is extended or adjusted under 35 U.S.C. 154(b) by 42 days.

(21) Appl. No.: 11/083,404

(22) Filed: Mar. 18, 2005

(65) Prior Publication Data
US 2006/0207349 A1   Sep. 21, 2006

(51) Int. Cl.
*G01L 1/26* (2006.01)
(52) U.S. Cl. ............... 73/862.393; 73/862.391; 73/862.392; 73/862.381
(58) Field of Classification Search ............... 73/862.392–862.393, 862.57; 242/370, 242/226, 223
See application file for complete search history.

(56) References Cited

U.S. PATENT DOCUMENTS

| | | | | |
|---|---|---|---|---|
| 916,081 A | * | 3/1909 | Williams | .................... 104/117 |
| 1,458,014 A | * | 6/1923 | Wailes | ........................ 177/233 |
| 3,016,741 A | * | 1/1962 | Kulp | ..................... 73/862.541 |
| 3,656,251 A | * | 4/1972 | Snider et al. | ................... 43/17 |
| 4,083,233 A | | 4/1978 | Seal | |
| 4,317,377 A | | 3/1982 | Wrinkle | |
| 4,667,625 A | * | 5/1987 | Malone | ...................... 119/785 |
| 5,346,158 A | * | 9/1994 | Epperson | .................... 242/236 |
| 6,339,198 B1 | * | 1/2002 | Yamanouchi | ............... 177/148 |
| 6,367,339 B1 | | 4/2002 | Lilonsky | |
| 6,799,473 B2 | * | 10/2004 | Adrian | ........................ 73/856 |

* cited by examiner

*Primary Examiner*—Edward Lefkowitz
*Assistant Examiner*—Punam Patel
(74) *Attorney, Agent, or Firm*—Brian L. Belles; Wolf, Block, Schorr & Solis-Cohen

(57) ABSTRACT

An apparatus and method of reliably and consistently setting the drag of a fishing reel for a specified strength of fishing line. The invention utilizes a resilient member that can be moved between a resting position and a stressed position. The fishing line is coupled to the resilient member. The resilient member is selected so that the force required to move the resilient member from the resting position to the stressed position is a predetermined fraction of the strength of the fishing line for which the drag is to be set. The invention is also a method of using the apparatus to set the drag.

19 Claims, 6 Drawing Sheets

APPARATUS AND METHOD FOR SETTING THE DRAG OF A FISHING REEL

FIELD OF THE INVENTION

The present invention relates generally to the field of fishing and sporting equipment, and specifically to methods and apparatus for setting the drag of a fishing reel.

BACKGROUND OF THE INVENTION

The importance of having the drag of a fishing reel set properly is well understood among fishermen. Properly setting you drag is especially important in fishing for larger fish, such as tuna and other species, that put up a substantial fight and take longer periods of time to land. If the drag of the fishing reel is set to "tight" for the fishing line being used, the fishing line will break when the fish exerts a force on the line that exceeds the strength rating of the fishing line being used. However, if the drag of the fishing reel is set to "loose," the fishing line will be pulled form the reel too easily, resulting in an insufficient amount of force being applied to a hooked fish. This increases the amount of time it will take to the land the fish and can result in the fish twisting and/or wrapping the fishing line about itself or another object, which often results in the fishing line being snapped and the fish lost It has been noted that the longer a fish is on the line, the more things can go wrong. Thus, the importance of applying maximum pressure to a fish early in the fight when your tackle is still in the best shape is recognized as a vital consideration.

A number of styles of drag reels are currently used, including lever drag reels (which allows a user to switch between drag settings) and star drag reels (which are much trickier and are operated by a matter of feel). There are also products which serve as fish scales/drag scales that are available in both mechanical and digital models. However, these devices always categorize setting the drag as a secondary consideration and, thus, are less than optimal.

A typical mechanical scale consists of a hollow tubular aluminum body with a hook and an internal extension spring which reads in 1 pound increments (or less up) to varying levels of capacity. Some of these models have a highest pound indicator which shows you visually the highest reading where the indicator stopped after pressure was applied. The digital models are offered in plastic or molded bodies and again have a hook for weighing fish, or setting drags that read out on a digital LED face. These devices usually require more than one person and are at best inconvenient for the user to operate. A hand held drag checker is available on the market; however, a user is on their own to set and reset the drag while using the checker to verify that you have obtained the proper tension. This process is difficult, cumbersome, and awkward to use.

Other devices for setting the drag on a fishing line are known in the art. For example, U.S. Pat. No. 4,317,377 to Wrinkle purports to disclose a drag adjustment device for fishing reels which includes a switch means operatively connected to an indicator light, a means, such as a knob, for selectively shifting the switch means upward or downward, and a spring biased drag element which when pulled by a fishing line pulls the drag element into contact with the switch means to activate the indicator light signaling that the drag is set. Additionally, U.S. Pat. No. 4,083,233 to Seal purports to disclose a drag adjusting device for fishing reels including two arms held together by a hinge, with a plurality of passageways located along each arm for receiving fishing line therein to set the drag to a certain percentage of the maximum test strength of the line.

Finally, U.S. Pat. No. 6,367,339 to Lilonsky et al. purports to disclose a drag setting device that includes a cable, line, or other fastening member which can be attached to a fishing line of a fishing rod and reel. The drag setting device of Lilonsky further includes a pulling member for pulling the fishing line towards the drag setting device, a first actuator for selecting the amount of tension applied by the drag setting device to the fishing line, and a second actuator for causing the drag setting device to apply the selected tension to the fishing line.

The aforementioned devices are less than optimal in that they are expensive to manufacture, difficult to use, cumbersome, unreliable, irreparable, and/or require two people to use

SUMMARY OF THE INVENTION

It is therefore an object of the present invention to provide an apparatus and method for setting the drag of a fishing reel in a consistent and/or reliable manner.

It is another object of the present invention to provide an apparatus and method for setting the drag of a fishing reel that is easy to use.

A further object of the present invention is to provide an apparatus and method for setting the drag of a fishing reel that is cost effective to manufacture.

A yet further object of the present invention is to provide an apparatus and method for setting the drag of a fishing reel that can be used for fishing lines of various strengths/tests.

A still further object of the present invention is to provide an apparatus and method for setting the drag of a fishing reel that is easy and/or cost effective to repair.

These and other objects of the present invention are met by the present invention, which in one aspect can be a drag setting apparatus comprising: a resilient member movable between a resting position and a stressed position, a force being required to move the resilient member from the resting position to the stressed position; means for coupling a fishing line having a specified strength to the resilient member; means for prohibiting movement of the resilient member beyond the stressed position from the resting position; and wherein the force required to move the resilient member from the resting position to the stressed position is a predetermined fraction of the specified strength of the fishing line.

The invention provides a simple, properly designed precision mechanism for applying the correct percentage of tension through the fishing line which results in the user being able to properly set the drag of the fishing reel in conjunction with the fishing line being used on any type of reel.

During use to set the drag of a fishing line for a fishing line having a specific strength/test, the invention is a method comprising: (a) providing the drag setting apparatus described above; (b) coupling one end of the fishing line to the coupling means, the other end of the fishing line operably coupled to a fishing reel having an adjustable drag, the fishing reel operably mounted to a fishing pole; (c) tightening the drag of the fishing reel to a force greater than the force required to move the resilient member from the resting position to the stressed position; (d) fixing the drag setting apparatus in a stationary position; (e) pulling a tip of the fishing pole away from the drag setting apparatus until the resilient member moves from the resting position to the stressed position; and (f) loosening the drag of the fishing reel until the resilient member begins to move from the stressed position toward the resting position (which results in the fishing line being drawn from the closed reel and the drag overcome).

DETAILED DESCRIPTION OF THE DRAWINGS

Figure 1:
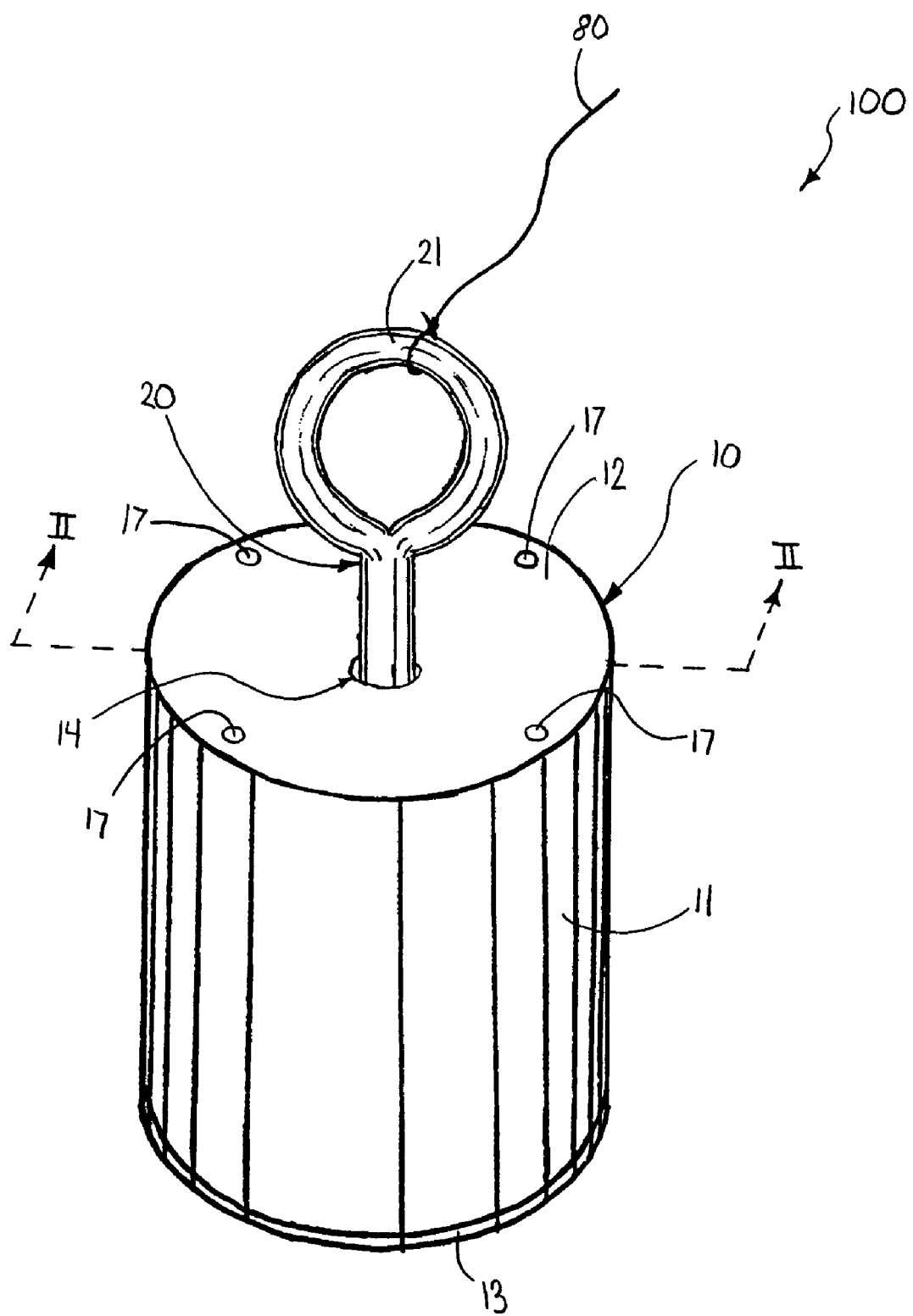
FIG. 1 is a top perspective view a drag setting apparatus according to an embodiment of the present invention.

FIG. 1 illustrates a drag setting apparatus 100 according to an embodiment of the present invention. The drag setting apparatus 100 comprises a cylindrical housing 10. The cylindrical housing 100 comprises a tubular wall 11 and top and bottom plates 12, 13 respectively. While the housing 10 of the drag setting apparatus 100 is illustrated as being cylindrical in shape, the housing 10 can take on any shape, including without limitation, rectangular, spherical, triangular, hexagonal, trapezoidal, or irregularly shaped. In some embodiments of the invention, the housing may be omitted. In such embodiments, plates or other members can be used to perform the structural functions of the housing.

As discussed in greater detail below, the bottom plate 13 is detachable from the rest of the housing 10 for ease of repair and access to the inside of the housing 10. However, the bottom plate 13 can be welded or otherwise permanently secured to the housing 10 if desired. The top plate 12 is integral to the tubular wall 11, but can be designed to be removable if desired.

The housing 10 can be formed by machining a single piece of material, including without limitation, steel, aluminum, plastic, and other metals or alloys. Preferably, the material of which housing 10 is constructed is corrosion resistant. Nonetheless, the invention is not limited to any specific material of construction.

In some embodiments, the housing 10 will have a height of 2–5 inches and a diameter of 3–6 inches. However, the housing 10 can be any desired size. The exact size of the drag setting apparatus 100 will be determined on a case by case basis and will be dictated by such factors as the strength rating/test of the fishing line it is designed for use with and the number of spring assemblies to be incorporated therein (see e.g. FIG. 5).

Figure 2:
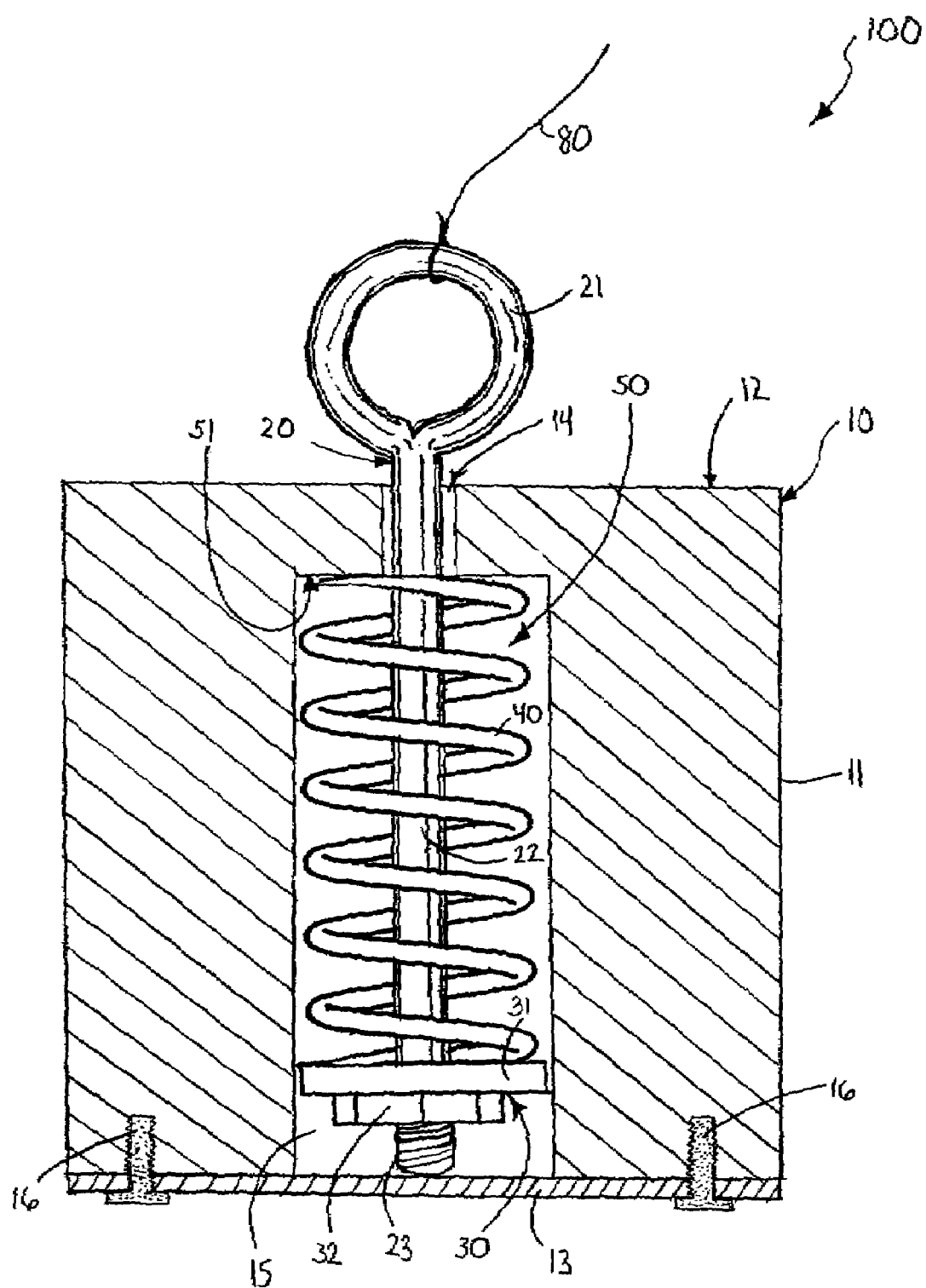
FIG. 2 is a cross-sectional view of the drag setting apparatus of FIG. 1 along view II—II with a spring assembly in a resting position.

Referring to FIG. 2, a cross-sectional view of drag setting apparatus 100 along view II—II is illustrated. The top plate 12 of the housing 10 has an opening 14 therein. The opening 14 forms a passageway into a cavity 15 formed by the housing 10.

A spring assembly 50 is positioned within the cavity 15. The spring assembly 50 comprises an eye bolt 20, a flange nut 30, and a compression spring 40. The eye bolt 20 comprises an eye portion 21 and a shaft portion 22. The bottom end of the shaft portion 22 of the eye bolt 20 comprises threads 23 on its outer surface for facilitating threaded engagement to the flange nut 30. The flange nut 30 comprises a flange portion 31 and a nut portion 32.

In assembling the drag setting apparatus 100, the housing 10 and the eye bolt 20 (without the compression spring 40 and the flange nut 30) are provided. The bottom plate 13 is removed from the housing 10 at this time by removing bolts 16. The bottom end of shaft portion 22 of the eye bolt is inserted into the opening 14 of the housing 10. While the invention is not limited to any particular size of eye bolt 20, the eye bolt 20 is preferably selected so that its shaft portion 22 forms a tight clearance with the opening/passageway 14. Moreover, the eye bolt 20 is preferably of sufficient length that so that the eye portion 21 of the eye bolt 20 protrudes from the opening 14 while the shaft portion 22 extends through the entirety of the cavity 15. As will be discussed in detail below, the eye portion 21 protrudes from the opening 14 of the housing so that a fishing line 80 having a specified strength/test can be coupled thereto.

Once the shaft portion 22 of the eye bolt is fully extended into the cavity 15 of the housing 10, the compression spring 40 is slid into the cavity 15 from the open bottom, thereby surrounding the shaft portion 22 of the eye bolt 20. In some embodiments, it is preferred that the cavity 15 be sized so that a tight clearance is formed between the compression spring 40 and the walls of the cavity 15. Once the compression spring 40 is positioned in the cavity 15 around the shaft portion 22 of the eye bolt 20, the flange nut 30 is threadily engaged to the eye bolt 20 via the threads 23. When engaged to the eye bolt 20, the flange portion 31 of the flange nut 30 is facing upward.

As the threaded engagement of the flange nut 30 to the eye bolt 20 is continued, the top surface of the flange portion 31 contacts the compression spring 40. The flange portion 31 of the flange nut 30 is larger in size than the compression spring 40. The compression spring 40 rests atop the flange portion 31 of the flange nut 30 and can not slip off. Thus, the flange nut 30 retains the compression spring 40 in position during use and prohibits the compression spring 40 from disengaging the shaft portion 22 of the eye bolt 20.

The flange nut 30 is tightened until the compression spring 40 is slightly compressed between the upper surface 51 of the cavity 50 and the flange portion 31 of the flange nut 30. The bottom plate 13 is then mounted to the housing 10 via the bolts 16, enclosing the cavity 15 and slightly compressing the compression spring 40 in the process. When the bottom plate 13 is mounted to the housing 10, the bottom end of the eye bolt 20 is in contact with the bottom plate 13, thereby applying a low amount of stress to the compression spring 40.

The eye bolt 20 is a standard eye bolt, such as ⅛ inch zinc plated steel eye bolt. However, the eye bolt 20 can be constructed of any material, including metals, alloys, plastics, etc, and can be of any desired size or length. The flange nut 30 can be a zinc plated steel serrated hex flange nut. However, the invention is not so limited.

The compression spring 40 can be a zinc plated wire compression spring. However, the compression spring 40 can be constructed of any material and may or may not be coated. As will be discussed in greater detail below with respect to the functioning of the drag setting apparatus 100, the dimensions and properties, such as spring force, length, pitch, number of coils, wire thickness, inner and outer diameters, etc., of the compression spring 40 are dictated by the strength/test of the fishing line 80 for which the drag setting apparatus 100 is designed to be used with.

Figure 3:
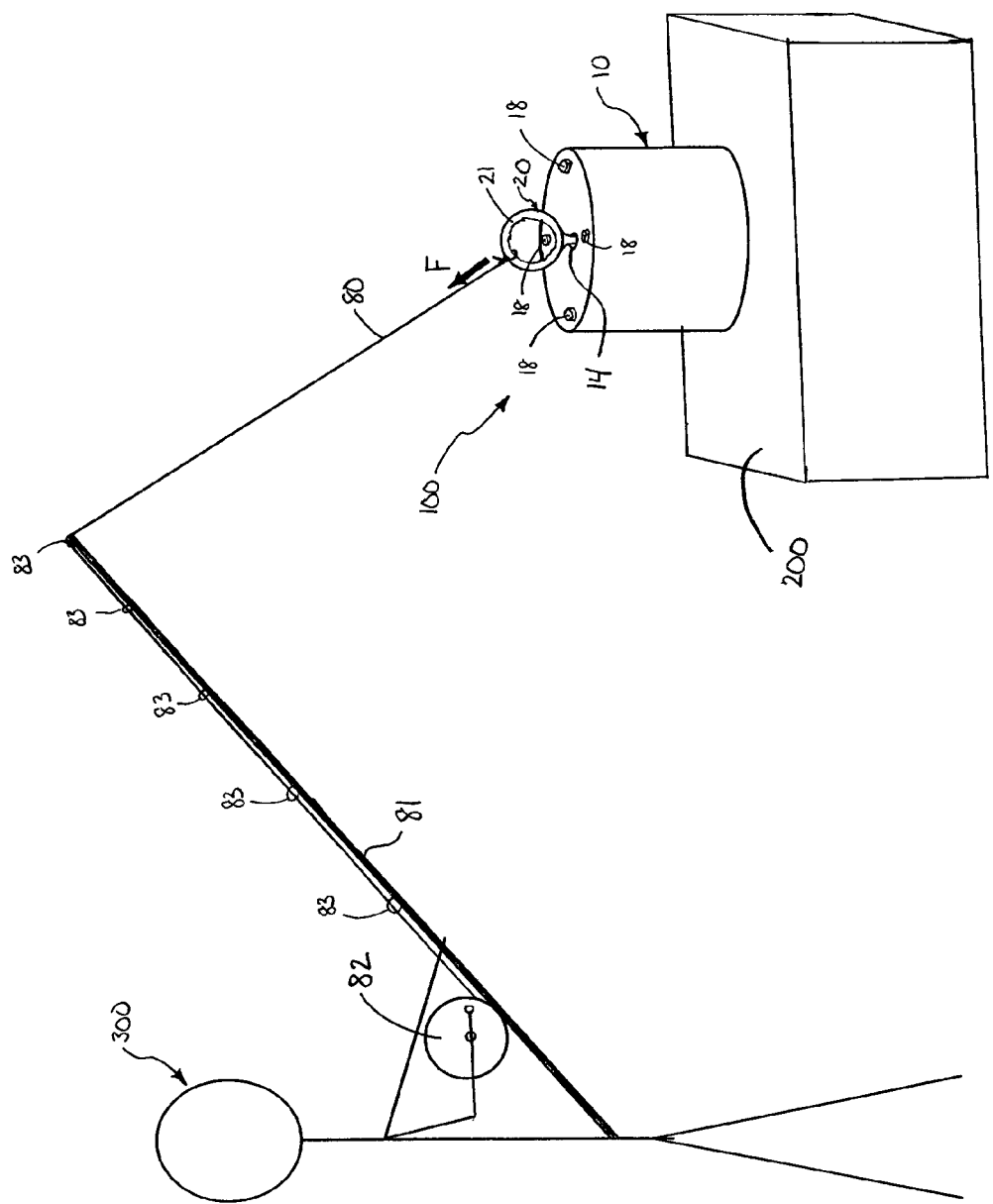
FIG. 3 is a schematic of a user using the drag setting apparatus of FIG. 1 to set the drag of a fishing reel for fishing line having a specified strength/test.
Figure 4A:
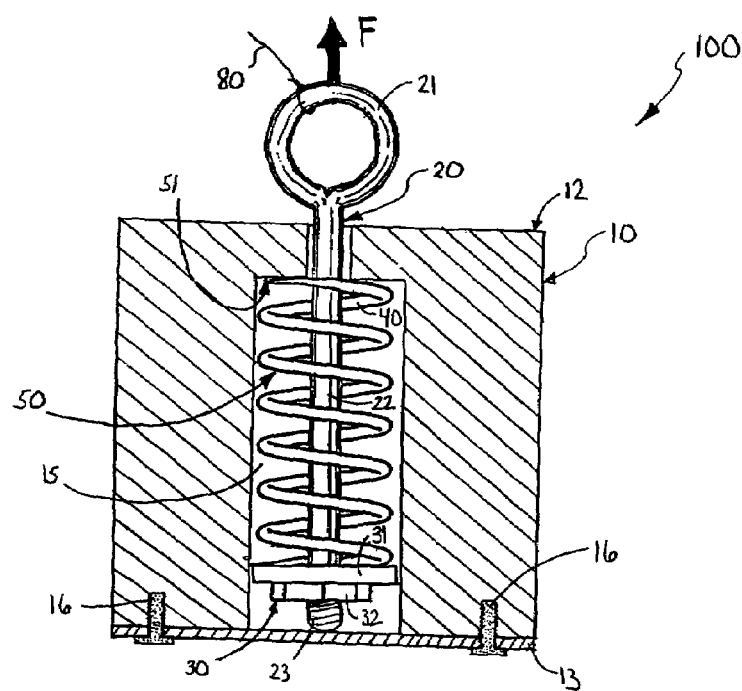
FIG. 4A is a cross-sectional view of the drag setting apparatus of FIG. 1 along view II—II with the compression spring in the resting position.
Figure 4B:
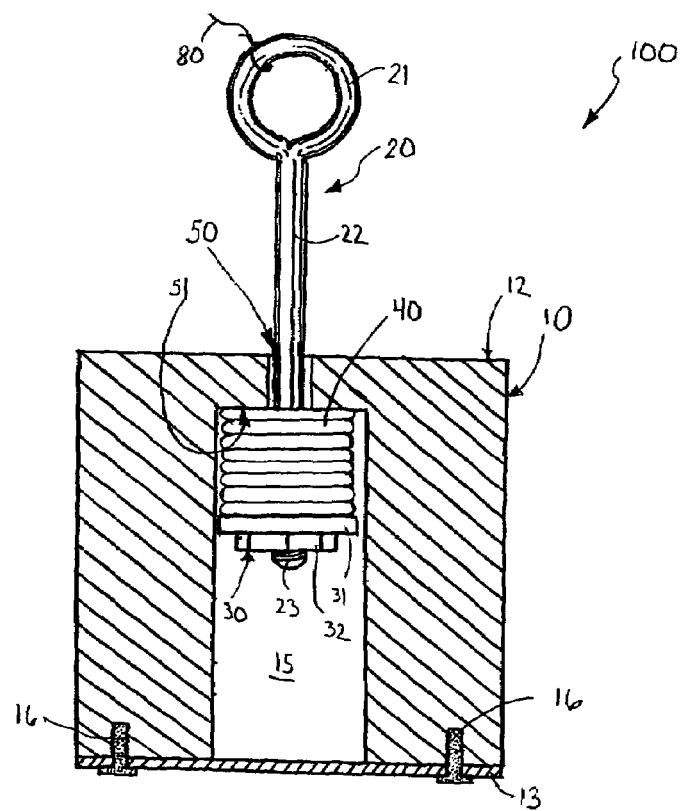
FIG. 4B is a cross-sectional view of the drag setting apparatus of FIG. 1 along view II—II with the compression spring in the stressed position.

With reference to FIGS. 3, 4A, and 4B, the use/functioning of the drag setting apparatus 100 to set the drag of fishing reel for a fishing line having a specified strength/test of 20 lbs. will be discussed. It should be noted that while the operation will be exemplified using 20 lb. test fishing line, the invention is not so limited and the drag setting apparatus can be specifically designed to be used in conjunction with fishing line of any strength/test through proper design and choice of the resilient member.

Referring to FIG. 3, a user 300 has a fishing pole 81 having a reel 82. The fishing pole 81 and reel 82 have fishing line 80 spooled and strung thereon. The fishing line 80 has a specified strength/test of 20 lbs. The fishing line 80 is spooled about the reel 82 in the ordinary operational manner and the fishing line 81 is strung through the eyes 83 of the fishing pole 81. The loose end of the fishing line 80 is then tied, or otherwise coupled, to the eye portion 21 of the eye hook 20 of the drag setting apparatus 100. For example, the user 300 may decide to tie a hook and/or swivel to the fishing line 80 and couple the hook and/or swivel to the eye portion 21 if desired.

The drag setting apparatus 100 is rigidly secured to a stationary body 200 via bolts 18. The bolts 18 extend through the housing 10 of the drag setting apparatus 100 via holes 17 (FIG. 1). The bolts 18 either engage threaded holes of the stationary body 200 or extend through holes in a member of the stationary body 200 and engage corresponding nuts on the opposite side. Alternatively, the drag setting apparatus 100 can be welded or otherwise secured to the stationary body 200 in any manner, including without limitation, through the use of a flange, screws, nails, clamps, or a tight fit assembly. In some embodiments, the user 300 or another person may physically hold the drag setting apparatus 100 in place during use.

There is no limit on the type of structure that can qualify as the stationary body 200, so long as the body will not be picked up or moved when the necessary force F is applied to the fishing line to set the drag. Suitable stationary bodies include a deck, a structure of a boat (such as a rail, a floor, a chair, a wall, etc.), or a land body.

When the fishing line 20 is coupled to the eye portion 21 of the eye bolt 20 and no force is being applied by the user, the compression spring 40 of the spring assembly 50 is in a resting position, as illustrated in FIG. 4A.

Referring to FIG. 4A, when the compression spring 40 is in the resting position, the compression spring 40 is a substantially extended orientation. However, in order to avoid rattling and the unwanted effects of vibration during periods of non-use, the compression spring 40 is slightly compressed in the resting position as discussed above. Thus, when the spring assembly 50 is in the resting position, the compression spring is under a low amount of stress. In some embodiment, if desired, the spring assembly 50 can be designed so that the compression spring 40 is under no stress when in the resting position. This can be accomplished by shortening the length of the compression spring used, extending the length of the cavity 15, or loosening the flange nut 30.

Referring back to FIG. 3, once the fishing line 81 is properly coupled to the eye portion 21, the user 300 tightens the drag on the reel 82 so that the fishing line 81 will not be released from the closed reel 82 during the following step. Once the drag is tightened, the user 300 slowly pulls the fishing pole 81 upward and away from the drag setting apparatus 100 in a controlled manner. This results in the fishing line 81 applying a force F to the eye bolt 20. As the user 300 continues to increase and apply the force F, the eye bolt 20 will be pulled upward through the hole 14 of the housing 10, thereby increasing the length of the shaft portion 22 of the eye bolt 20 that protrudes from the housing 10 via the opening 14. The raising of the eye bolt 20 with the force F causes compression of the compression spring 40. The eye bolt 20 continues to be raised, and the compression spring 40 compressed, as a result of the force F being applied until the compression spring 40 reaches a stressed position, as illustrated in FIG. 4B.

Referring now to FIG. 4B, the drag setting apparatus 100 is illustrated wherein the compression spring 40 of the spring assembly 50 is in the stressed position. When sufficient force F is applied to the eye bolt 20, the compression spring 40 is compressed between the flange portion 31 of the flange but 30 and upper surface 51 of the cavity 15. This compression continues until the compression spring 40 can not be compressed any further. At this point, the compression spring 40 (through interaction with the top surface 51 and flange portion 31) is prohibited from being compressed further (i.e. beyond the stressed position), thereby prohibiting further movement of the eye bolt 20 in the upward direction.

The compression spring 40 is specifically chosen/designed to properly set the drag of the reel 82 for fishing line 81, which has a 20 lb. strength/test. More specifically, the compression spring 40 is designed/chosen so that the force F required to compress the compression spring 40 from the resting position (FIG. 4A) to the stressed position (FIG. 4B) is a fraction of the strength rating of the fishing line 81 (which in this example is 20 lbs.). In some embodiments, the compression spring 40 will be selected so that the force F required to compress the compression spring 40 from the resting position to the stressed position is within a range of approximately 15 to 45% of the strength rating of the fishing line 81. For example, when the fishing line 81 has a 20 lb. strength/test rating, the compression spring 40 is selected so that the force F required to compress the compression spring 40 from the resting position to the stressed position is between approximately 3 lbs. and 9 lbs.

In other embodiments, the compression spring 40 will be selected so that the force F required to compress the compression spring 40 from the resting position to the stressed position is within a range of approximately 25 to 35% of the strength rating of the fishing line 81. In such embodiments, for example, when the fishing line 81 has a 20 lb. strength/test rating, the compression spring 40 is selected so that the force F required to compress the compression spring 40 from the resting position to the stressed position is between approximately 5 lbs. and 7 lbs. The exact fraction used may be specific to the type of fishing to be performed by the user 300.

Referring back to FIG. 3, once the user 300 has supplied sufficient force F so that the eye bolt 20 is in a fully raised position (i.e., the stressed position of FIG. 4B), the user 300 begins to slowly loosen the drag on the reel 82 until the drag is overcome by the resilient force of the compression spring 40, resulting in the fishing line 81 being drawn from the closed reel 82 and the eye bolt 20 (and spring assembly 50) returning to the resting position. At this point, the loosening of the drag of the closed reel 42 is ceased. The drag of the reel 42 is properly set for fishing with fishing line 81 having a 20 lb strength/test rating.

It should be noted that many variations of the invention exist that are still within the spirit of the invention, which must be measured by the claims. For example, the invention is not limited to the use of a compression spring but can use any resilient member, such as an extension spring, a stretchable band, elastic, a coil spring, a leaf spring, or the like. In some embodiments that utilize an extension spring, the bottom end of the extension spring will be coupled to the bottom plate or other structure of the drag setting apparatus while the top end of the extension spring will be coupled to eye bolt or other means for coupling the fishing line. The housing will be designed so that upward movement of the eye bolt (or other coupling means) beyond the stressed position is prohibited when the extension spring is stretched from the resting position. This can be accomplished by controlling the height of the cavity or by utilizing a stopping member or plate. The principals of the relative spring force requirements discussed above can be easily applied to this embodiment. Embodiments of the invention utilizing stretchable bands will be designed in a similar manner.

The invention is also not limited to an eye bolt for coupling the fishing line to the resilient member used. In some embodiment, the fishing line may be able to be coupled directly to the resilient member. In still other embodiments, regular bolts, plates, eye hooks, screws, bars having a hole, or the like can be used to coupled the fishing line to the resilient member.

Nor is the invention limited to use with any specific strength/test rating of fishing line. The invention can be designed to set the drag of a reel for any strength/test of fishing line by simply selecting a resilient member that meets the aforementioned relative force requirements. For example, the drag setting apparatus can be designed to set the drag for fishing line having a 100 lb. strength/test rating by designing the resilient member to have a resilient force preferably between 15 and 45 lbs, and most preferably between 25 to 35 lbs.

Figure 5:
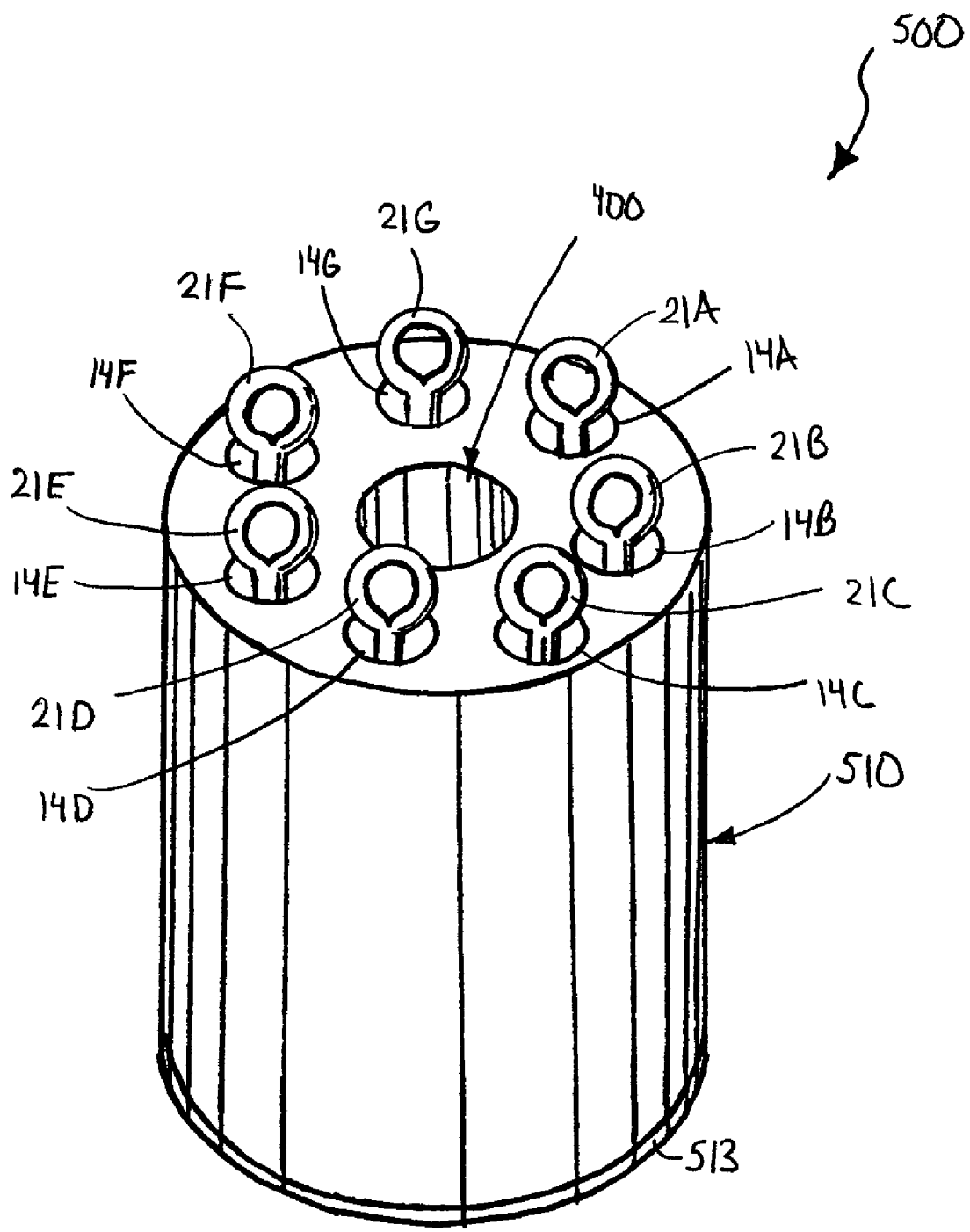
FIG. 5 is a top perspective view a drag setting apparatus according to a second embodiment of the present invention.

Referring now to FIG. 5, in some embodiments of the invention, the invention can be drag setting apparatus 500 that comprises the necessary hardware to set the drag for fishing lines of multiple/various strengths. The functioning of the drag setting apparatus 500 is similar to that described above with respect to the drag setting apparatus 100 except that a single housing 510 has a plurality of cavities and spring assemblies positioned therein. Each spring assembly (only the eye portion 21A–21G of the eye bolts is visible) is positioned in a separate cavity, similar to that exemplified in FIG. 2. However, the compression spring of each spring assembly is selected to have the desired resiliency properties for a different strength/test rating of fishing line. Specifically, each compression spring is selected to require a force to move that compression spring from its resting position to its stressed position that is a predetermined fraction of a specific, and different, strength of fishing line.

The drag setting apparatus 500 includes a hole 400 for receiving and rigidly securing a snugger structure, such as an eye hook, eye bolt, or ring (not shown). Because the snugger is rigidly secured to the housing 510, the snugger can be used set the fishing knot by hooking the fishing line to the snugger and yanking the fishing pole. (While not illustrated, a snugger can be easily incorporated into the drag setting apparatus 100 of FIGS. 1–4.)

Figure 6:
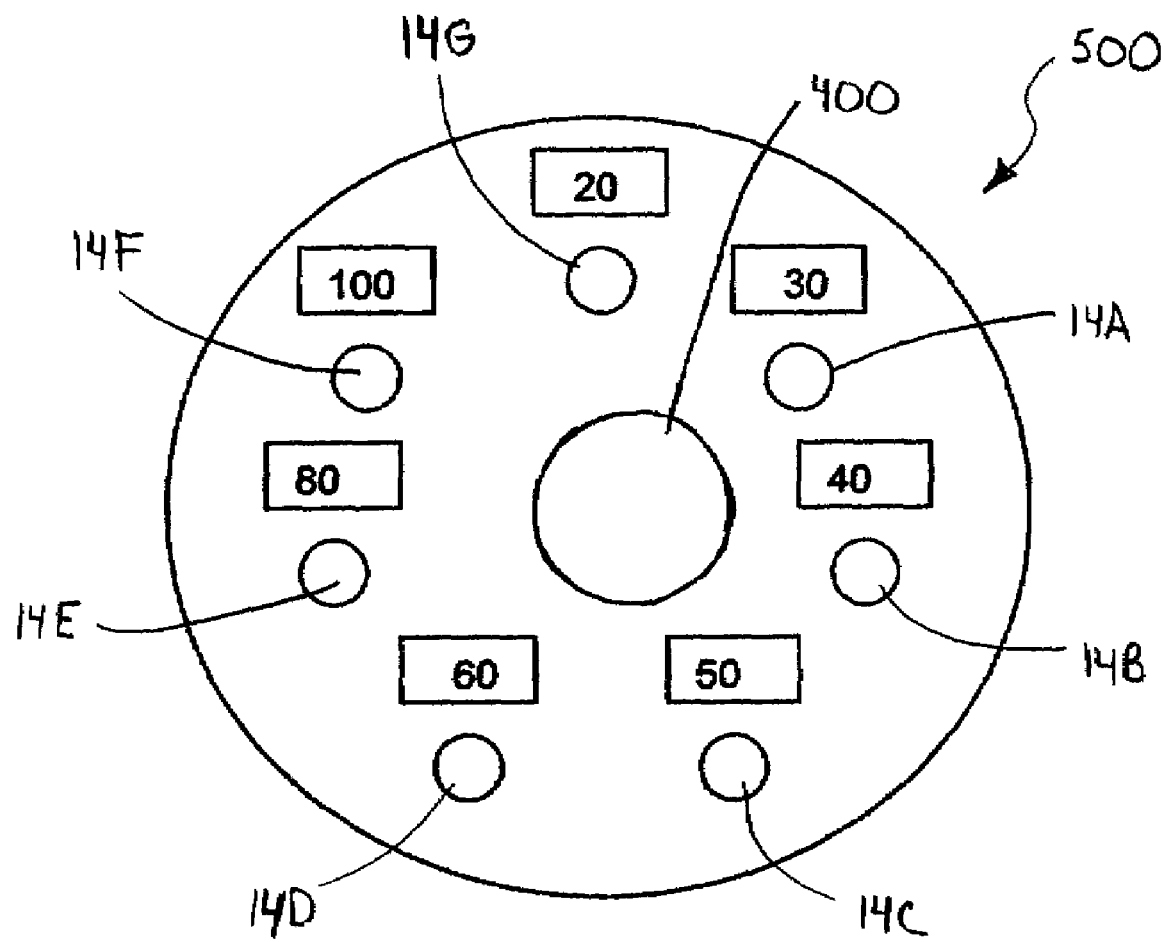
FIG. 6 is a top view of the drag setting apparatus of FIG. 5 according to an embodiment of the present invention

As shown in FIG. 6, it is preferred that the drag setting apparatus 500 comprise indicators of the strength of fishing line that each spring assembly is designed to set the drag for.

While the invention has been described and illustrated in sufficient detail that those skilled in this art can readily make and use it, various alternatives, modifications, and improvements should become readily apparent without departing from the spirit and scope of the invention.

What is claimed is:

1. A drag setting apparatus comprising:
   a compression spring movable between a resting position and a stressed position, a force being required to move a compression spring from the resting position to the stressed position;
   means for fishing line having a specified strength to a compression spring
   means for prohibiting movement of a compression spring beyond the stressed position; from the resting position;
   wherein the force required to move a compression spring from the resting position to the stressed position is a predetermined fration of the specified strength of the fishing line; and
   wherein the coupling means comprises a shaft having a flange, the compression spring surrounding and retained on the shaft by the flange.

2. The apparatus of claim 1 further comprising a housing having a cavity and an opening into the cavity, the compression spring located within the cavity, the coupling means accessible from outside of the housing.

3. The apparatus of claim 2 wherein the coupling means protrudes from the housing via the opening.

4. The apparatus of claim 2 wherein the prohibiting means comprises an inner surface of the housing.

5. The apparatus of claim 2 wherein the housing comprises a detachable plate for access to the cavity.

6. The apparatus of claim 2, wherein the coupling means comprises an eye bolt and the flange is a flanged nut threadily engaged to the eyebolt, thereby forming a spring assembly; the spring assembly positioned in the cavity of the housing so that the eye portion of the eye bolt protrudes from opening while the flange nut and the compression spring remain in the cavity; and
   wherein an inner surface of the housing retains the compression spring in the cavity and acts as the prohibiting means.

7. The apparatus of claim 1 wherein the coupling means comprises an eye bolt.

8. The apparatus of claim 1 wherein the coupling means comprises an eye bolt threadily engaged to a flanged nut and the resilient member is a compression spring, the compression spring surrounding a shaft portion of the eye bolt and being retained on the shaft portion by the flange nut.

9. The apparatus of claim 1 wherein the predetermined fraction is within a range of 15 to 45%.

10. The apparatus of claim 9 wherein the predetermined fraction is within a range of 25 to 35%.

11. A drag setting apparatus comprising:
   a resilient member movable between a resting position and a stressed position, a force being required to move the resilient member from the resting position to the stressed position;
   means for coupling a fishing line having a specified strength to the resilient member;
   means for prohibiting movement of the resilient member beyond the stressed position from the resting position; and
   wherein the force required to move the resilient member from the resting position to the stressed position is a predetermined fraction of the specified strength of the fishing line; and
   wherein the resilient member is under a low amount of stress in the resting position.

wherein the force required to move the resilient member from the resting position to the stressed position is a predetermined fraction of the specified strength of the fishing line; and wherein the resilient member is under a low amount of stress in the resting position.

12. A drag setting apparatus comprising:

a housing having a plurality of cavities and an opening into each cavity;

a plurality of resilient members movable between a resting position and a stressed position, each resilient member being positioned within one of the cavities;

means for coupling a fishing line to each resilient member;

means for prohibiting movement of each resilient member beyond its stressed position from its resting position; and wherein a force is required to move each resilient member from its resting position to its stressed position, the force required for each resilient member being a predetermined fraction of a different strength of fishing line.

13. The apparatus of claim 12 wherein the housing is cylindrical in shape and comprises a detachable plate for access to the cavities.

14. The apparatus of claim 1 further comprising the fishing line operably coupled to the coupling means.

15. The apparatus of claim 1 further comprising means to secure the apparatus to a stationary object.

16. A drag setting apparatus comprising:

a resilient member movable between a resting position and a stressed position, a force being required to move the resilient member from the resting position to the stressed position:

means for coupling fishing line having a specified strength to the resilient member;

means for prohibiting movement of the resilient member beyond the stressed position from the resting position;

a housing having a plurality of cavities and an opening into each cavity;

wherein the coupling means comprises and eye bolt threadily engaged to a flanged nut, the resilient member being a compression spring surrounding a shaft portion of the eye bolt and retained on the shaft portion by the flange nut, thereby forming a spring assembly;

a plurality of the spring assemblies, wherein the force required to move the resilient member of each spring assembly from the resting portion to the stressed position is a predetermined fraction of a different strength of fishing line;

one of the spring assemblies being positioned in each one of the cavities so that an eye portion of the eye bolt protrudes from the opening of the cavity while the flange nut and the compression spring are retained within the cavity;

wherein the housing is cylindrical in shape and comprises a detachable plate for access to the cavities;

wherein the predetermined fraction is within a range of 25 to 35% wherein each compression spring is under a low amount of stress when in the cavity and in the resting position; and means to secure the housing to a stationary object.

17. A method of setting drag comprising:

providing a drag setting apparatus comprising a resilient member movable between a resting position and a stressed position, a force being required to move the resilient member from the resting position to the stressed position, means for coupling a fishing line having a specified strength to the resilient member, means for prohibiting movement of the resilient member beyond the stressed position from the resting position, wherein the force required to move the resilient member from the resting position to the stressed position is a predetermined fraction of the specified strength of the fishing line;

coupling one end of a fishing line having the specified strength to the coupling means, the other end of the fishing line operably coupled to a fishing reel having an adjustable drag, the fishing reel operably mounted to a fishing pole;

tightening the drag of the fishing real to a force greater than the force required to move the resilient member from the resting position to the stressed position;

fixing the drag setting apparatus in a stationary position;

pulling a tip of the fishing pole away from the drag setting apparatus until the resilient member moves from the resting position to the stressed position; and loosening the drag of the fishing reel until the resilient member begins to move from the stressed position toward the resting position.

18. The method of claim 17 wherein the predetermined fraction is within a range of 25 to 35%.

19. The method of claim 17 wherein the drag setting apparatus provided in step (a) further comprises:

a housing having a cavity and an opening into the cavity, the resilient member located within the cavity, the coupling means accessible from outside of the housing;

wherein the coupling means comprises an eye bolt threadily engaged to a flanged nut and the resilient member is a compression spring, the compression surrounding a shaft portion of the eye bolt and being retained on the shaft portion by the flange nut, thereby forming a spring assembly;

the spring assembly positioned in the cavity of the housing so that an eye portion of the eye bolt protrudes from the opening while the flange nut and the compression spring remain in the cavity; and wherein an inner surface of the housing retains the compression spring in the cavity and act as the prohibiting means.

* * * * *

UNITED STATES PATENT AND TRADEMARK OFFICE
CERTIFICATE OF CORRECTION

PATENT NO. : 7,216,553 B2  
APPLICATION NO. : 11/083404  
DATED : February 2, 2007  
INVENTOR(S) : William Robinson Page 1 of 1

It is certified that error appears in the above-identified patent and that said Letters Patent is hereby corrected as shown below:

Title Page, Item  
(76) Inventor: please delete "Willaiam"  
              please insert --William--

Column 9, line 41, after "comprises", please delete "and"  
Column 9, line 41, after "comprises", please insert --an--

Column 10, line 25, after "fishing", please delete "real"  
Column 10, line 25, after "fishing", please insert -- reel --

Column 10, line 45, after "the compression", please insert -- spring --

Signed and Sealed this

Seventh Day of August, 2007

JON W. DUDAS  
*Director of the United States Patent and Trademark Office*

UNITED STATES PATENT AND TRADEMARK OFFICE
CERTIFICATE OF CORRECTION

PATENT NO. : 7,216,553 B2  
APPLICATION NO. : 11/083404  
DATED : May 15, 2007  
INVENTOR(S) : William Robinson Page 1 of 1

It is certified that error appears in the above-identified patent and that said Letters Patent is hereby corrected as shown below:

Title Page, Item  
(76) Inventor: please delete "Willaiam"  
        please insert --William--

Column 9, line 41, after "comprises", please delete "and"  
Column 9, line 41, after "comprises", please insert --an--

Column 10, line 25, after "fishing", please delete "real"  
Column 10, line 25, after "fishing", please insert -- reel --

Column 10, line 45, after "the compression", please insert -- spring --

This certificate supersedes Certificate of Correction issued August 7, 2007.

Signed and Sealed this

Twenty-eighth Day of August, 2007

JON W. DUDAS  
*Director of the United States Patent and Trademark Office*